United States Patent
Kurtz et al.

(10) Patent No.: US 7,284,440 B2
(45) Date of Patent: Oct. 23, 2007

(54) LINE PRESSURE COMPENSATED DIFFERENTIAL PRESSURE TRANSDUCER ASSEMBLY

(75) Inventors: Anthony D. Kurtz, Ridgewood, NJ (US); Louis DeRosa, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 12 days.

(21) Appl. No.: 10/897,567

(22) Filed: Jul. 23, 2004

(65) Prior Publication Data

US 2005/0081637 A1    Apr. 21, 2005

Related U.S. Application Data

(60) Provisional application No. 60/489,848, filed on Jul. 24, 2003.

(51) Int. Cl.
*G01L 13/02*    (2006.01)
(52) U.S. Cl. .............. 73/753; 73/721; 73/727; 73/716
(58) Field of Classification Search ............ 73/721, 73/726, 727, 719, 716
See application file for complete search history.

(56) References Cited

U.S. PATENT DOCUMENTS

| | | | |
|---|---|---|---|
| 4,777,826 A * | 10/1988 | Rud et al. ............... | 73/708 |
| 5,286,671 A | 2/1994 | Kurtz et al. | |
| 6,422,088 B1 * | 7/2002 | Oba et al. ............... | 73/754 |
| 6,427,530 B1 * | 8/2002 | Krueger et al. ......... | 73/152.46 |
| 6,612,179 B1 | 9/2003 | Kurtz | |
| 6,672,171 B2 * | 1/2004 | Gu et al. ............... | 73/724 |
| 6,909,975 B2 * | 6/2005 | Dozoretz et al. ........ | 702/50 |

* cited by examiner

*Primary Examiner*—Andre J. Allen
(74) *Attorney, Agent, or Firm*—Plevy, Howard & Darcy, PC

(57) ABSTRACT

A pressure transducer apparatus including: first and second pluralities of piezoresistors each coupled in Wheatstone bridge configurations, wherein the bridges are coupled together to provide a first output being indicative of a differential pressure; and, a third plurality of piezoresistors coupled in a Wheatstone bridge configuration and being suitable for providing a second output being indicative of an absolute line pressure. A compensator may be employed for adjusting the first output for line pressure variation responsively to the second output.

7 Claims, 3 Drawing Sheets ous # LINE PRESSURE COMPENSATED DIFFERENTIAL PRESSURE TRANSDUCER ASSEMBLY

CROSS REFERENCE TO RELATED APPLICATIONS

This application claims priority to U.S. Provisional Patent Application Ser. No. 60/489,848, filed Jul. 24, 2003, the entire disclosure of which is hereby incorporated by reference as if fully set forth in its entirety herein.

FIELD OF THE INVENTION

The present invention relates generally to pressure sensing, and more particularly to differential pressure sensing.

BACKGROUND OF THE INVENTION

Piezoresistive sensor structures are widely used in pressure or force measuring. Generally, the prior art is replete with a number of patents that describe various configurations and methods of fabricating piezoresistive pressure sensing devices.

Generally, a piezoresistive device includes a bridge pattern of resistors, which are mounted or otherwise diffused on one side of a relatively thin diaphragm member. The diaphragm, which may be fabricated from silicon, and deflects upon application of a pressure thereto, causes the piezoresistors to vary their magnitude according to the deflection of the diaphragm. Differential pressure measurements can be accomplished using a differential transducer that provides an output indicative of the difference between two pressures.

In aircraft engines, and other applications, it is often desirable to measure relatively small differential pressures, which occur across a wide range of line pressures. For example—measuring 5 pounds per square inch differential (psid) with reference to 0 pounds per square inch absolute (psia), and subsequently with reference to 150 psia, may be desired.

This may conventionally be accomplished by porting the pressures to be measured to opposite sides of a single pressure-sensing element. However, this approach is largely insensitive to line pressure variation. More particularly, this single element approach can prove unreliable as porting requires using tubing and small cavities which are directly in contact with the media to be measured. The media is often a dirty, moist air, or other fluid, with particulate contamination. Accordingly, these tubes and cavities are largely incompatible for long term, reliable use with such media. Additionally, moisture can collect and subsequently freeze in the tubing or cavities causing damage to the device. Therefore, it is desirable to eliminate the need for both internal tubes and small cavities.

SUMMARY OF THE INVENTION

A pressure transducer apparatus including: first and second pluralities of piezoresistors each coupled in Wheatstone bridge configurations, wherein the bridges are coupled together to provide a first output being indicative of a differential pressure; a third plurality of piezoresistors coupled in a Wheatstone bridge configuration and being suitable for providing a second output being indicative of an absolute line pressure; and, a compensator for adjusting the first output for line pressure variation responsively to the second output.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts, and.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for the purpose of clarity, many other elements found in typical pressure sensing systems and methods of using the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

According to an aspect of the present invention, two substantially identical piezoresistive absolute pressure sensors may be provided such that separate pressures may be applied to them. An additional absolute pressure sensor can be employed to compensate for the effect of line pressure variance on the measurement.

More particularly, two independent absolute pressure transducers, each electrically coupled as half of a Wheatstone bridge, may be employed. This approach has been commonly used on pressure transducers with limited line pressure variance. Each transducer can be preferably formed in accordance with the teachings commonly assigned U.S. Pat. No. 5,286,671, entitled, "FUSION BONDING TECHNIQUE FOR USE IN FABRICATING SEMICONDUCTOR DEVICES" the entire disclosure of which is also incorporated by reference as if being set forth in its entirety herein. Briefly, each transducer may include a deflectable diaphragm and four piezoresistors electrically coupled in a Wheatstone Bridge configuration formed on or therein. Two piezoresistors each decrease with positive normal stress and two piezoresistors each increase with positive normal stress in response to deflection of the diaphragm as is well known. The piezoresistors may be formed of highly doped P+silicon. The circuit nodes of the Wheatstone bridge may take the form of four oversized P+silicon electrical contact areas or fingers, which are mainly located in non-active areas of the wafer. It should be understood the active portions of the wafer may be defined as that portion defined by the diaphragm, as this portion deflects in response to an applied pressure as is well known. The remaining portions are referred to as the non-active regions.

Alternatively, any conventional wafer processing technique which enables dialectically isolated piezoresistive sensor elements to be formed on semiconductor material using dielectric films of $SiO_2$ or the like could also be used.

Figure 1A:
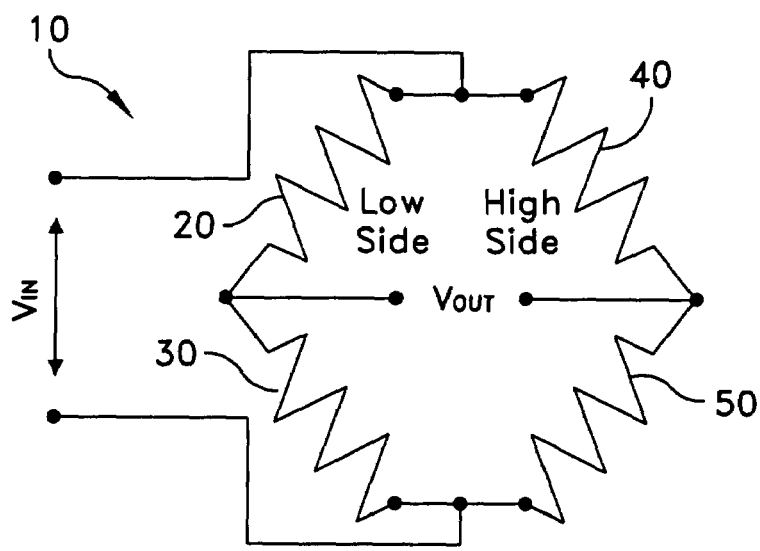
FIG. 1A illustrates a schematic representation of a differential bridge sensor circuit formed from two individual pressure sensors (not pictured) according to an aspect of the present invention.

Referring now to FIG. 1A, there is shown a schematic representation of a differential bridge sensor circuit 10 formed from the two individual absolute sensors (not pictured) according to an aspect of the present invention. Each sensor includes at least two resistive elements (20, 30 in the case of the first absolute sensor and 40, 50 in the case of the second absolute sensor) arranged in an open set of two uncoupled half-bridges. Each resistive element in each sensor may exhibit a substantially same percentage change of resistance when exposed to an identical pressure. The circuit 10 may also include a plurality of contacts or pins, such that each resistive element of each half-bridge can be connected to a contact.

It should be recognized that depending on the particular configuration of each sensor, different resistive element will either be subjected to compression or tension forces. Each half-bridge from each sensor can be interconnected to a half-bridge of the other sensor giving a full bridge, which depending on which half-bridges are used, either represents the sum or the difference of the pressures applied to each sensor. Such a sensor is disclosed in commonly assigned U.S. Pat. No. 6,612,179, the entire disclosure of which is also hereby incorporated by reference herein.

Figure 1D:
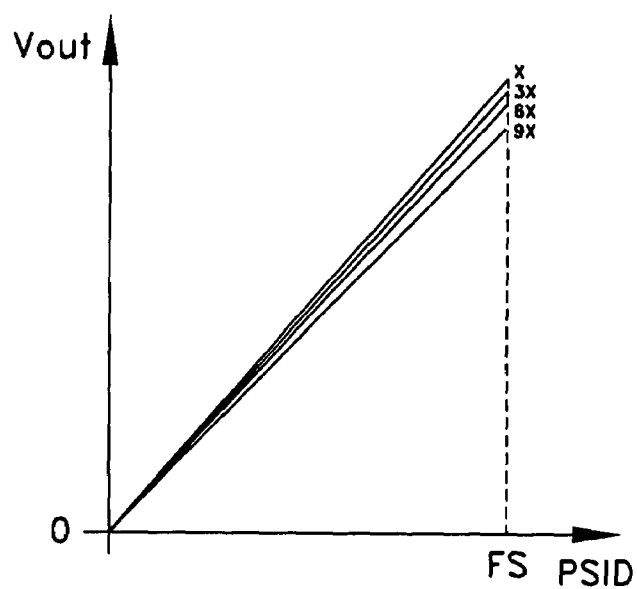
FIG. 1D illustrates a graphical representation of output voltage versus applied force for 1, 3, 6 and 9 times ratios of differential pressure to line pressure; and, FIG. 2 illustrates a schematic representation of an apparatus according to an aspect of the present invention.
Figure 1B:
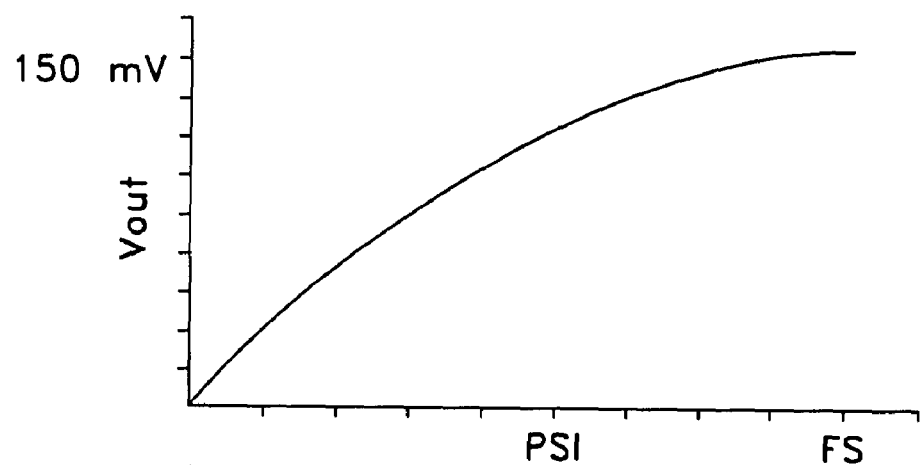
FIG. 1B illustrates the non-linearity of output voltage versus applied pressure for low and high side pressure sensing assemblies.
Figure 1C:
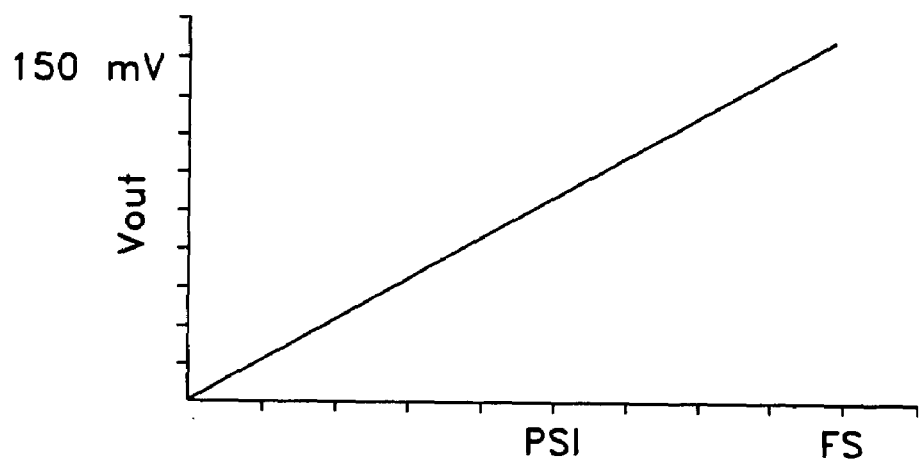
FIG. 1C illustrates an output voltage versus applied force for the composite full bridge formed from the two half bridge sensing structures.

FIG. 1B illustrates a non-linearity of output voltage versus applied pressure for the low and high side pressure sensing assemblies. FIG. 1C illustrates the relative linearity of output voltage versus applied force for the composite full bridge formed from the two half bridge sensing structures. FIG. 1D illustrates a graphical representation of output voltage versus applied force for 1, 3, 6 and 9 times ratios of differential pressure to line pressure. Thus, as is shown, errors in measured pressure may result from variations in line pressure.

That is, as the ratio of line pressure variance to differential pressure increases, error may be induced by the non-linearity of each individual sensor (as is shown in FIG. 1B), therefore limiting it's usefulness for measuring small differential pressures over widely variant line pressures. This error is believed to be an unfortunate consequence of providing sufficient output from the coupled independent half bridges over the differential pressure measured.

According to an aspect of the present invention, an additional independent absolute pressure sensor element can be employed to compensate for the effect of line pressure variance on the measurement. For example, a differential pressure may be measured between first and second ports, while an absolute pressure is measured from the second port. This absolute pressure measurement may be used to determine the line pressure. Given an accurate measure of line pressure, an appropriate algorithm can be employed to compensate for the inaccuracy in the differential measurement due to non-linearity of the individual half bridge sensors (as is shown in FIG. 1D, for example). This algorithm correction can be accomplished either internally with active electronics in the pressure transducer or externally on the aircraft utilizing the Full Authority Digital Engine Control (FADEC) or similar control and/or suitable computer instructions in the form of code, for example. An exemplary configuration is shown in FIG. 2.

Figure 2:
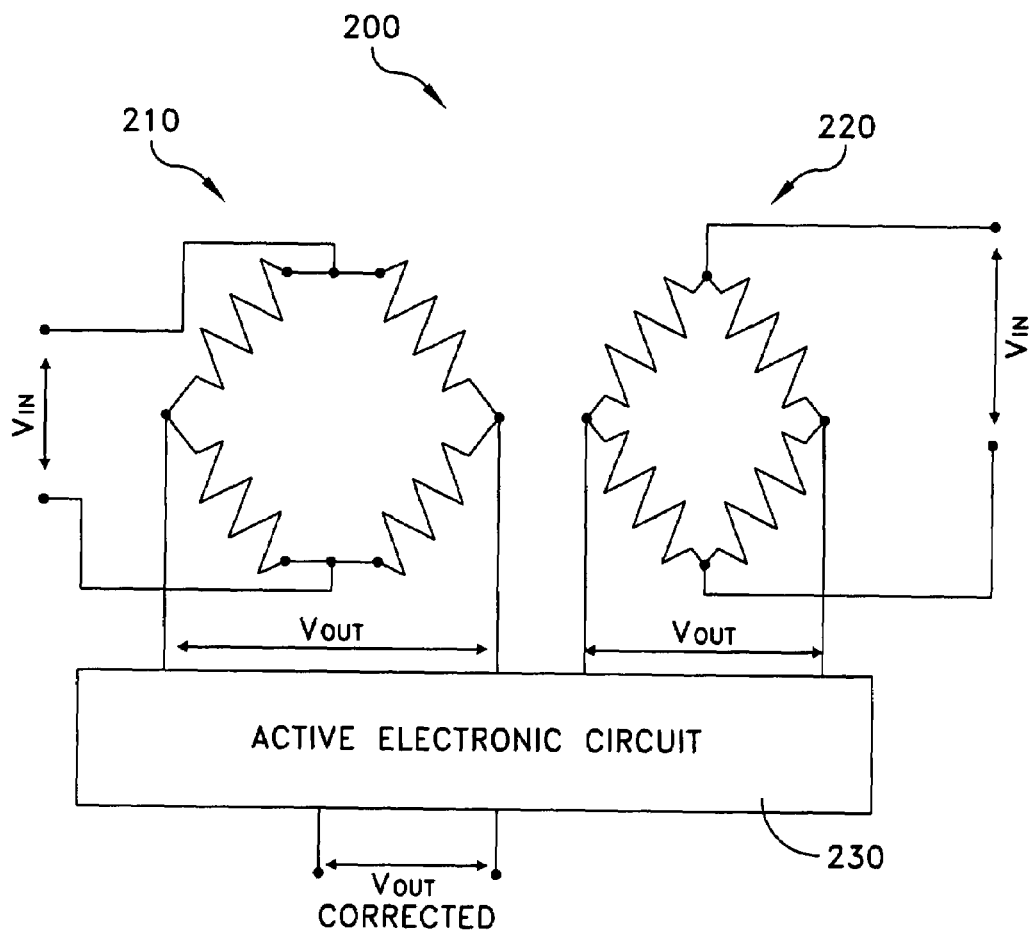

Referring now to FIG. 2, apparatus 200 includes a composite differential full-bridge sensor 210 formed from two half-bridge absolute pressure sensors. System 200 further includes an absolute pressure sensor 220. An electronic circuit 230 receives output voltages from the sensors 210, 220. By comparing the outputs, the ratio of differential pressure to line pressure may be determined. A correction factor, acquired from a lookup table, or electrically induced upon the output of sensor 210, may be applied dependently upon the determined ratio to compensate for the experienced error.

By way of non-limiting example only, the differential pressure may be determined by electrically subtracting outputs from first and second sensors, each being associated with a first and second port, respectively. The absolute line pressure may then be determined by direct measurement of a third sensor also associated with the second port. The differential pressure reading may then be corrected for the influence of line pressure as measured by the third sensor. This may be accomplished either by using an active electronic circuit or interface, or by using correction factors/ lookup tables in downstream software.

In summary, a highly rugged media compatible pressure transducer capable of accurately measuring small differential pressures over varying line pressures can be manufactured by the use of two independent absolute pressure sensor half-bridges electrically coupled and an independent absolute pressure sensor used to actively correct for non-linearity errors.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

What is claimed is:

1. A pressure transducer apparatus comprising:
   first and second pluralities of piezoresistors each coupled in Wheatstone bridge configurations, wherein said bridges are coupled together and provide a first output being indicative of a differential pressure between first and second ports;
   a third plurality of piezoresistors coupled in a Wheatstone bridge configuration and providing a second output being indicative of an absolute line pressure from said second port; and,
   a compensator mitigating line pressure variation in the first output by adjusting said first output responsively to said second output.

2. The apparatus of claim 1, wherein said first and second pluralities of piezoresistors collectively form a full-bridge configuration.

3. The apparatus of claim 2, wherein said second and third plurality of piezoresistors form an uncoupled full-bridge configuration.

4. The apparatus of claim 1, wherein said compensator comprises code for employing an algorithm to compensate for non-linearity of the first and second pluralities of piezoresistors.

5. The apparatus of claim 1, wherein said compensator comprises a circuit to compensate for non-linearity of the first and second pluralities of piezoresistors.

6. The apparatus of claim 1, wherein said compensator uses a Full Authority Digital Engine Control (FADEC) to compensate for non-linearity of the first and second pluralities of piezoresistors.

7. A pressure transducer apparatus comprising:
   a first Wheatstone bridge based absolute pressure sensor being responsive to a first pressure associated with a first port;

second and third Wheatstone bridge based absolute pressure sensors being responsive to a second pressure associated with a second port;

a first output coupled to the first and second sensors and providing a signal indicative of a differential pressure corresponding to the first and second pressures and a line pressure variation;

a second output coupled to the third sensor and providing a signal indicative of the second pressure; and, a compensator coupled to the first and second outputs and mitigating the line pressure variation by adjusting said first output responsively to said second output.

* * * * *